United States Patent [19]

Stefanini

[11] Patent Number: 4,868,009
[45] Date of Patent: Sep. 19, 1989

[54] METHOD FOR UNIFORM DEPOSITION OF SOLID LUBRICANT ON RIGID DATA STORAGE DISCS

[76] Inventor: Zorro Stefanini, 666 Brentwood Dr., San Jose, Calif. 95129

[21] Appl. No.: 231,591

[22] Filed: Aug. 8, 1988

Related U.S. Application Data

[63] Continuation of Ser. No. 55,140, May 28, 1987, abandoned.

[51] Int. Cl.$^4$ .............................. B05D 5/12; B32B 3/02
[52] U.S. Cl. ..................................... 427/127; 118/503; 427/240; 427/407.1; 427/255.5; 427/255.6; 427/255.7; 428/64; 428/695; 428/900
[58] Field of Search ................................. 427/127-132, 427/48, 240, 407.1, 255.5, 255.6, 255.7; 428/900, 695, 64; 118/503

[56] References Cited

U.S. PATENT DOCUMENTS 3,640,767  2/1972  Fulton et al. ..................... 427/127

Primary Examiner—Bernard Pianalto
Attorney, Agent, or Firm—Fliesler, Dubb, Meyer & Lovejoy

[57] ABSTRACT

The invention is concerned with a method and apparatus for uniformly depositing a solid lubricant coating on a data storage disc. The method comprises passing the entire disc, in horizontal orientation with a first side thereof facing downwardly, through a vertically extending zone having a lubricant in vapor form streaming upwardly therein while maintaining the disc at a temperature such that the lubricant condenses on contact therewith and while controlling the time of residence of the disc in the zone such as to provide a desire thickness for the coating. The disc is rotated about its center as it passes through the zone at a rate selected to ensure uniformity of deposition of the lubricant on the first side of the disc. The orientation of the disc is reversed so that its second side faces downwardly. The entire disc is passed in horizontal orientation with the second side downward through a vertically extending zone having a lubricant in vapor form streaming upwardly therein while the disc is maintained at a temperature such that the lubricant condenses on contact therewith and while the time of residence of the disc in the zone is controlled such as to provide a desired thickness for the coating. The disc is rotated about its center as it passes through the zone at a rate selected to ensure uniformity of deposition of the lubricant on the second side of the disc. The resultant product is a very uniformly coated disc and this is accomplished without the use of a solvent for the lubricant.

13 Claims, 1 Drawing Sheet

METHOD FOR UNIFORM DEPOSITION OF SOLID LUBRICANT ON RIGID DATA STORAGE DISCS

This application is a continuation of Ser. No. 07/055/40, filed May 28, 1989, now abandoned.

TECHNICAL FIELD

The present invention is concerned with a method and apparatus for providing a solid lubricant coating on a hard (or rigid) disc of the nature utilized to store data.

BACKGROUND ART

Use of layers of solid lubricant on data storage discs such as magnetic discs is well known. Generally, such layers have been applied by dissolving the lubricant in a solvent which is easily vaporized and then spraying, wiping or dipping the solution on to the disc and allowing the solvent to evaporate. This requires a number of steps and the handling of a volatile solvent, such as, for example, trichlorotrifluoroethane, which can create somewhat hazardous conditions. Furthermore, the polymers which can be deposited in such a manner are somewhat limited in that they must be soluble in the solvent. Generally, this means that relatively low molecular weight solid lubricants must be utilized. Also, when lubricant is added as part of a solution the solution may be unevenly distributed over the disc, or may become unevenly distributed due to gravitic flow when drying, whereby some areas of the disc will be covered with thicker layers of lubricant than desired and other areas of the disc will be covered with thinner layers of lubricant than desired. That is, there is a significant problem in getting a truly uniform film of solid lubricant over the entire disc.

The present invention is directed to solving one or more of the problems as set forth above.

DISCLOSURE OF INVENTION

In accordance with an embodiment of the present invention a method is set forth for uniformly depositing a solid lubricant coating on a data storage disc. The method comprises first passing the entire disc, in horizontal orientation with a first side thereof facing downwardly, through a vertically extending zone having a lubricant in vapor form streaming upwardly therein while maintaining the disc at a temperature such that the lubricant condenses on contact therewith and while controlling the time of residence of the disc in the zone to be such as to provide a desired thickness for the coating. The disc is rotated about its center as it passes through the zone at a rate selected to ensure uniformity of deposition of the lubricant on the first side of the disc. The orientation of the disc is reversed so that the second side of the disc faces downwardly. The entire disc is passed in horizontal orientation with the second side thereof facing downwardly through a vertically extending zone having a lubricant in vapor form streaming upwardly therein while maintaining the disc at a temperature such that the lubricant condenses on contact therewith and while controlling the time of residence of the disc in the zone such as to provide a desired thickness for the coating. The disc is rotated about its center as it passes through the zone at a rate selected to ensure uniformity of deposition of lubricant on the second side of the disc. A single zone, two separated parts of a single zone, or two separate zones may be utilized for the first and second passing steps.

In accordance with another embodiment of the present invention an apparatus is set forth for uniformly depositing a solid lubricant coating on a data storage disc. The apparatus comprises zone creating means for creating a vertically extending zone having a lubricant in vapor form streaming upwardly therein. The apparatus also includes first passing means for passing an entire disc having a first side and a second side through the zone with the disc in horizontal orientation with the first side thereof facing downwardly while maintaining the disc at a temperature such that the lubricant condenses on contact therewith. The apparatus also includes residence controlling means for controlling the residence time of the disc in the zone to be such as to provide a desired thickness for the coating. Orientation reversing means serve for reversing the orientation of the disc so that the second side thereof faces downwardly. Second passing means are provided for passing the entire disc through the zone with the disc in horizontal orientation with the second side thereof facing downwardly while maintaining the disc at a temperature such that the lubricant condenses on contact therewith. Rotating means are provided for rotating the disc about a center thereof as it passes through the zone.

Utilizing an apparatus in accordance with the present invention a solid lubricant can be deposited directly on a disc in an extremely uniform manner and to a desired thickness. And, the operation can be carried out without the necessity for dealing with highly volatile and sometimes dangerous solvents. Still further, the lubricant utilized can be of relatively high molecular weight. Furthermore, the lubricant can be selected such that it is converted to solid form as it passes upwardly past the disc whereby the waste product is entirely solid in nature and can be readily collected by filters and recycled, if desired.

BRIEF DESCRIPTION OF DRAWING

The invention will be better understood by reference to the figures of the drawing wherein like numbers denote like parts throughout and whereas.

BEST MODE FOR CARRYING OUT INVENTION

Figure 1:
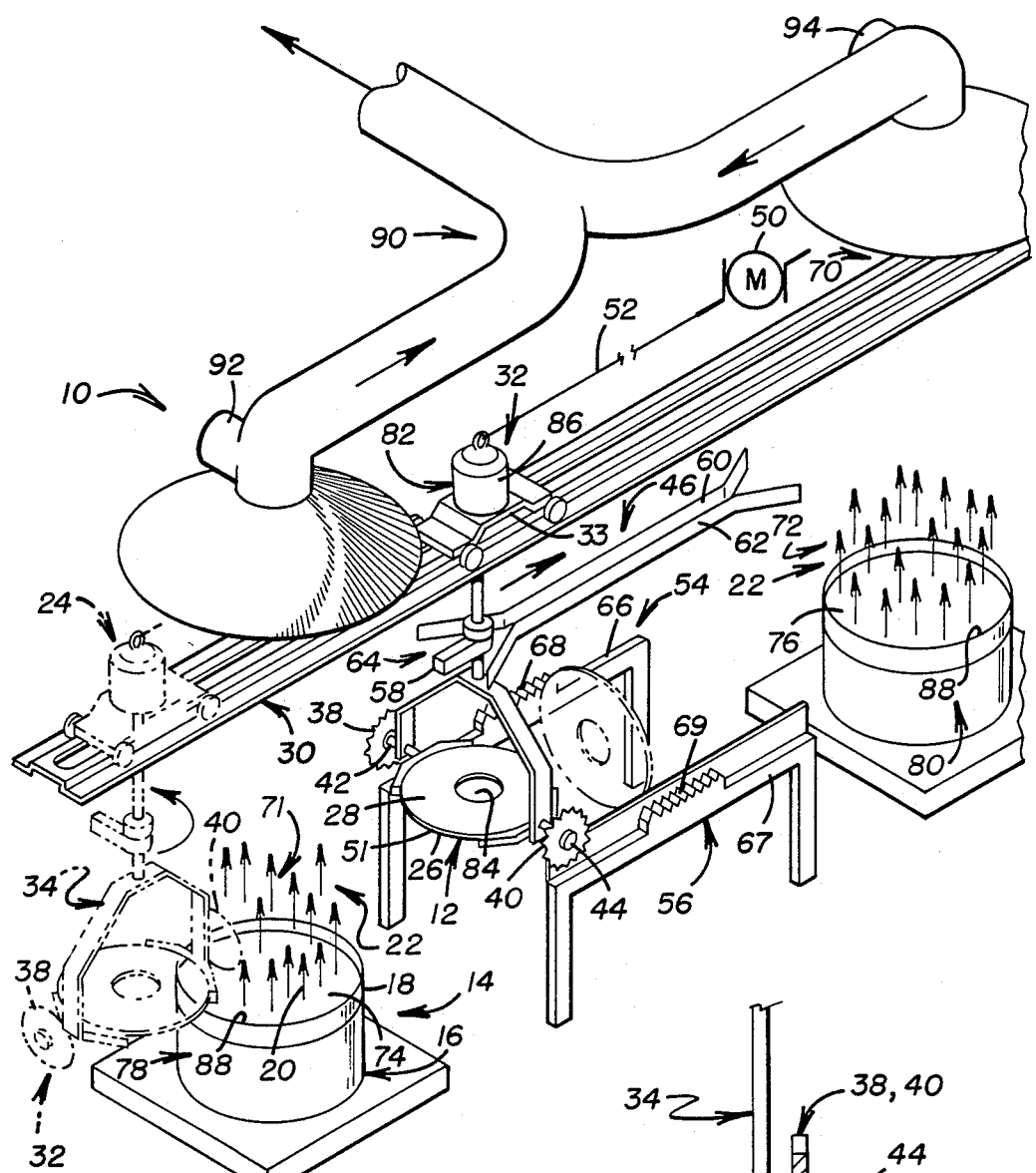
FIG. 1 illustrates, in perspective view, an apparatus in accordance with an embodiment of the present invention.

FIG. 1 illustrates an embodiment of the present invention wherein an apparatus 10 serves for uniformly depositing a solid lubricant coating on a data storage disc 12. The apparatus 10 includes zone creating means 14, in the embodiment illustrated a crucible 16 having an evaporation head 18 which contains in it, generally in molten form, a lubricant 20. Heating of the crucible container 16 leads to heating of the evaporation head 18, which in turn leads to the creation of a vertically extending zone 22 of upwardly streaming vaporized lubricant 20 just above the evaporation head 18.

Figure 2:
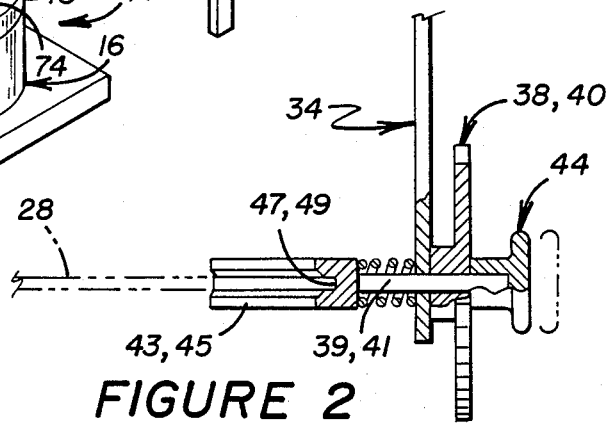
FIG. 2 illustrates, in enlarged view partially in section, a detail in the structure of the embodiment of FIG. 1.

First passing means 24 serves for passing the entire disc 12, having a first side 26 and a second side 28, through the zone 22 with the disc 12 in horizontal orientation with the first side 26 thereof facing downwardly. In the particular embodiment illustrated the first passing means 24 includes a track 30 passing above the zone 22 and a disc holder 32 carried by the track 30. The disc holder 32 includes a small car 33 and a structure 34 extending downwardly from the car 33 and into the zone 22. The structure 34 includes means 36 for holding the disc 12, in the embodiment illustrated a pair of gears 38,40 having their centers 42,44 in a plane including the disc 12. The pair of gears 38,40 (see FIG. 2) are connected to rods 39,41 which pass through the structure 34 and are attached to members 43,45 which define arcuate slots 47,49 which hold the disc 12 adjacent its periphery 51. The pair of gears 38,40 are oriented parallel to and equally spaced laterally from the track 30 at certain times by the orientation means 46, the use of which will be explained below. However, when the gears 38,40 pass through the zone 22 they rotate with the disc 12.

Residence time controlling means 48 is provided for controlling the residence time of the disc 12 in the zone 22 to be such as to provide a desired thickness for the coating on the disc. The residence time controlling means 48 is simply in the nature of a motor 50 which drives a cable 52 which motivates the disc holder 32. In the particular embodiment illustrated the cable 52 can be a continuous loop structure, if desired.

In accordance with the present invention orientation reversing means 54 are provided for reversing the orientation of the disc 12 so that the second side 28 thereof faces downwardly. In the particular embodiment illustrated the orientation reversing means 54 includes the means 46 for orienting the pair of gears 38,40 parallel to the track 30, plus a rack structure 56. The gears orienting means 46 includes a tab 58 carried by the structure 34 and a pair of aligning rails 60,62 which are parallel to one another and have a mouth 64 adapted to align and receive the tab 58, with the aligning rails 60,62 being parallel to the track 30 and to the rack structure 56.

As the tab 58 passes into the mouth 64 it is aligned parallel to the track 30. Since the tab 58 is also aligned parallel to the planes defined by the pair of gears 38,40, the pair of gears 38,40 are likewise aligned parallel to the track 30 and also parallel to the rack structure 56. The rack structure 56 includes a pair of parallel racks 66,67 which have teeth 68,69 adapted to and positioned to mesh with the gears 38,40. The number of teeth 68,69 on the rack structure 56 is selected whereby the orientation of the disc 12 is reversed by the time the gears 38,40 leave the rack structure 56 from what it was when the gears 38,40 engaged the rack structure 56. It is, of course, possible to rotate the disc 12 several times as it passes along the rack structure 56, but this is not necessary and not normally desirable and the orientation of the disc 12 is normally simply changed 180° as the gears 38,40 mesh with the rack structure 56.

Second passing means 70 are provided for passing the entire disc 12 through the zone 22 with the disc 12 in horizontal orientation with the second side 28 thereof facing downwardly while maintaining the disc 12 at a temperature such that the lubricant condenses on contact therewith. In accordance with the present invention the second passing means 70 is basically a continuation of the first passing means 24 in that it is a continuation of the track 30 which carries the disc holder 32 through the zone 22. In the embodiment illustrated in FIG. 1 the zone 22 comprises a first zone 71 and a second zone 72 and the lubricant 20 comprises a first lubricant 74 and a second lubricant 76 and the zone creating means 14 includes first zone creating means 78 for creating the first zone 71 and second zone creating means 80 for creating the second zone 72. It should be noted that, alternatively, the first zone creating means 78 and the second zone creating means 80 can be replaced with a single zone creating means and that the track 30 can, for example, follow an arcuate path which leads the disc 12 twice over the single zone creating means.

It is important to the present invention that rotating means 82 be provided for rotating the disc 12 about a center 84 thereof as it passes through the zone 22 (or the first zone 71 and the second zone 72). In the particular embodiment illustrated the rotating means 82 is in the nature of a motor 86 carried by the track 30 and supporting the disc holder 32. The motor 86 can have an internal timer to assure rotation, when desired, or can simply declutch when the tab 58 is aligned by the aligning rails 60,62. The motor 86 may carry its own power or may be powered via the track 30 alone or in combination with the cable 52.

It is the combination of the action of the rotating means 82 and having the entire disc 12 passed through the zone 22 which assures uniformity of coating on the disc 12 of the lubricant 20. Thus, if the zone 12 is created by heating the lubricant 20 in the evaporation head 18 in the crucible 16, it is important that an open top 88 of the evaporation head 18 have a minimum dimension at least as large as the diameter of the disc 12.

In a situation such as that illustrated in FIG. 1, wherein both a first lubricant 74 and a second lubricant 76 are present, it is generally desirable that these lubricants be identical in composition even though they are created by the different zone creating means 78 and 80. In this manner both sides of the disc 12 are coated with the same lubricant.

The lubricant chosen is preferably one which exists as a solid at room temperature and which reforms into a solid as it passes upwardly out of the vertically extending zone 22. In this manner all of the waste carried upwardly is in the form of solid particulates and may be collected for recycling by utilizing pumping means 90 which may be in the nature of a pair of blowers 92,94. The solid particulates may be collected by an appropriate filter (not shown) and recycled, if desired, to the appropriate crucible 16 (or 78 and 80).

The preferred lubricant comprises polytetrafluoroethylene since this provides particularly desirable lubricant properties in the solid state. Dependent upon the molecular weight of the particular polytetrafluoroethylene utilized the temperature of the crucible 16 can be selected. Useful polytetrafluoroethylenes include Teflon FEP (Fluoronated Ethylene Propylene) virgin grade, Teflon PFA (Perfluoroalkoxy) virgin grade, and Teflon TFE (Tetrafluoroethylene) virgin grade. The latter of these can be vaporized at a temperature of approximately 520° C. to form the zone 22.

An appropriate rate for moving the disc holder 32 along the track 30 is of the order of about 11 meter per minute and an appropriate rotation speed for the disc 12, if it is a 5¼ inch disc, is approximately 120 rpm. These numbers are in no way meant to be limiting in that the speed of movement along the track 30 can be varied to provide a coating of any desired thickness on the disc 12. And, the rotation speed of the disc 12 need only be sufficient so as to assure uniform distribution of the lubricant upon its surface. The speed of passage of the disc 12 through the zone 22 must be sufficient so that the disc 12 remains cool enough so that the lubricant condenses, either to a liquid which quickly solidify directly to a solid, on the disc 12. This is not a difficult speed adjustment to make since the lubricant 20 is generally only slightly above its boiling point and the disc 12 is generally initially at ambient temperature and does not become heated to the boiling point of the lubricant 20 as it passes through the zone 22. Thus, the speeds mentioned are merely illustrative.

In accordance with the method of the present invention a solid lubricant coating is deposited on the data storage disc 12 by first passing the entire disc 12 in horizontal orientation with the first side 26 thereof facing downwardly through a vertically extending zone 22 having lubricant 20 in vapor form streaming upwardly therein while maintaining the disc 12 at a temperature such that the lubricant condenses on contact therewith and while controlling the time of residence of the disc 12 in the zone 22 such as to provide a desired thickness for the coating. The disc 12 is rotated about its center as it passes through the zone 22 at a rate selected to ensure uniformity of deposition of the lubricant 20 on the first side 26 of the disc 12. The orientation of the disc 12 is reversed so that the second side 28 thereof faces downwardly. Then, the entire disc 12 is passed, again in horizontal orientation but with the second side 28 thereof facing downwardly, through the vertically extending zone 32 having the lubricant 20 in vapor form streaming upwardly therein and while maintaining the disc 12 at a temperature such that the lubricant 20 condenses on contact therewith and while controlling the time of residence of the disc 12 in the zone 22 such as to provide a desired thickness for the coating. The disc 12 is rotated about its center 84 as it passes through the zone 22 at a rate selected to ensure the uniformity of deposition of the lubricant 20 on the second side 28 of the disc 12. Each of the zones 70 and 72 for the first and second passages can be provided by positioning an appropriate crucible 16 with evaporation head 18 of the lubricant 20, with the evaporation head 18 having its open top 88 below where each of the zones 70,72 are required, and heating the lubricant in each of the evaporation heads 18 sufficiently to create each of the zones 70,72. It is preferred that in accordance with the present invention any lubricant not deposited on the disc 12 be pumped away, preferably in solid form, for example by the blowers 92,94.

INDUSTRIAL APPLICABILITY

The present invention provides a method and apparatus for depositing a solid lubricant 20 on a data storage disc 12 in a uniform manner on each side 26,28 of such a disc 12. Such discs 12 are useful for magnetically storing data and form parts of computer systems. The method and apparatus of the present invention are particularly useful with the so-called hard discs.

The invention, for convenience, has been described in accordance with specific embodiments thereof but is not limited to such embodiments.

Other aspects, objectives and advantages of this invention can be obtained from a study of the drawings, the disclosure and the appended claims which alone define the scope of the invention.

I claim:

1. A method of uniformly depositing a solid lubricant coating on a data storage disc which comprises a flat circular plate having first and second sides each having a magnetic surface, comprising:

passing the entire disc, while maintaining it in horizontal orientation with the first side thereof facing downwardly, through a vertically extending zone having a lubricant in vapor form streaming upwardly therein while maintaining the disc at a temperature such that the lubricant condenses on contact therewith and while controlling the time of residence of the disc in the zone such as to provide a desired thickness for the coating;

rotating the disc about its center as it passes through the zone at a rate selected to ensure uniformity of deposition of the lubricant on the first side of the disc;

reversing the orientation of the disc so that the second side thereof faces downwardly;

passing the entire disc, while maintaining it in horizontal orientation with said second side thereof facing downwardly, through a vertically extending zone having a lubricant in vapor form streaming upwardly therein while maintaining the disc at a temperature such that the lubricant condenses on contact therewith and while controlling the time of residence of the disc in the zone such as to provide a desired thickness for the coating; and rotating the disc about its center as it passes through the zone at a rate selected to ensure uniformity of deposition of the lubricant on the second side of the disc.

2. A method as set forth in claim 1, wherein a single zone is utilized for said first and second passing steps.

3. A method as set forth in claim 1, wherein two separate zones are utilized for said first and second passing steps.

4. A method as set forth in claim 1, wherein said lubricant comprises a fluorocarbon.

5. A method as set forth in claim 4, wherein said lubricant comprises polytetrafluoroethylene.

6. A method as set forth in claim 1, further including:

forming each of said zones for said first and second passing steps by positioning a reservoir of said lubricant having an open top below where each of said zones are required and heating the lubricant in each of said reservoirs sufficiently to create each of said zones.

7. A method as set forth in claim 6, further including:

pumping away any lubricant not deposited on said disc.

8. A method as set forth in claim 6, wherein a single zone is utilized for said first and second passing steps.

9. A method as set forth in claim 6, wherein two separate zones are utilized for said first and second passing steps.

10. A method as set forth in claim 9, wherein said lubricant comprises a fluorocarbon.

11. A method as set forth in claim 10, wherein said lubricant comprises polytetrafluoroethylene.

12. A method as set forth in claim 6, wherein the lubricant is a solid at room temperature and reforms in to a solid as it passes upwardly out of said zones.

13. A method as set forth in claim 12, further including:

pumping away any lubricant not deposited on said disc.

* * * * *